(12) United States Patent  (10) Patent No.: US 8,715,037 B2
Vaughan et al.  (45) Date of Patent: *May 6, 2014

(54) MATERIALS PROCESSING MEDIUM AND METHOD

(75) Inventors: Steven Bradley Vaughan, Bradford (GB); Philip James Harrison, Bradford (GB)

(73) Assignee: Vibraglaz (UK) Limited (GB)

( * ) Notice: Subject to any disclaimer, the term of this patent is extended or adjusted under 35 U.S.C. 154(b) by 133 days.

This patent is subject to a terminal disclaimer.

(21) Appl. No.: 13/228,633

(22) Filed: Sep. 9, 2011

(65) Prior Publication Data

US 2012/0167479 A1    Jul. 5, 2012

Related U.S. Application Data

(63) Continuation-in-part of application No. 12/677,357, filed as application No. PCT/GB2008/050821 on Sep. 12, 2008, now Pat. No. 8,430,718.

(30) Foreign Application Priority Data

Sep. 13, 2007 (GB) .................................. 0717849.4
Mar. 11, 2009 (GB) .................................. 0904202.9

(51) Int. Cl.
  *B24B 31/14* (2006.01)

(52) U.S. Cl.
  USPC ............... 451/35; 451/108; 451/113; 65/17.3

(58) Field of Classification Search
  USPC ................ 451/35, 104, 113; 501/2, 4, 5, 155; 65/17.3, 33.1, 33.5, 33.6
  See application file for complete search history.

(56) References Cited

U.S. PATENT DOCUMENTS

| | | | |
|---|---|---|---|
| 3,113,877 A * | 12/1963 | Janakirama-Rao | 501/2 |
| 3,113,878 A | 12/1963 | Martin | |
| 3,368,712 A | 2/1968 | Sanford et al. | |
| 3,405,002 A | 10/1968 | Martin | |
| 3,808,747 A | 5/1974 | Kenagy | |
| 3,819,387 A * | 6/1974 | Leger et al. | 501/4 |
| 3,820,968 A | 6/1974 | Haisty | |
| 3,837,724 A * | 9/1974 | Haberland et al. | 445/25 |
| 3,867,166 A * | 2/1975 | Sullivan | 427/376.4 |
| 3,900,306 A * | 8/1975 | Brueggemann et al. | 65/475 |
| 3,955,989 A * | 5/1976 | Nakamura | 501/5 |
| 4,110,085 A | 8/1978 | Balz | |
| 4,182,437 A * | 1/1980 | Roberts et al. | 188/251 A |
| 4,794,094 A * | 12/1988 | Makishima et al. | 501/5 |
| 4,938,788 A | 7/1990 | Segawa et al. | |
| 5,053,359 A | 10/1991 | Loxley et al. | |
| 5,637,030 A | 6/1997 | Chopra et al. | |
| 5,785,579 A | 7/1998 | Grondin | |

(Continued)

FOREIGN PATENT DOCUMENTS

EP    1 495 236 B1   8/2005
WO   WO 01/85393 A1  11/2001

OTHER PUBLICATIONS

Plasma Treatment of Glass—V.S. Bessertnyi—2001.*

*Primary Examiner* — George Nguyen (74) *Attorney, Agent, or Firm* — Myers Bigel Sibley & Sajovec, P.A.

(57) ABSTRACT

An abrasive element consisting substantially of a glass material that is at least partially devitrified.

35 Claims, 9 Drawing Sheets

(56) References Cited

U.S. PATENT DOCUMENTS

| | | |
|---|---|---|
| 5,935,885 A | 8/1999 | Hnat et al. |
| 5,981,413 A | 11/1999 | Hale |
| 6,261,386 B1 | 7/2001 | Perepezko et al. |
| 6,312,775 B1 | 11/2001 | Nagata et al. |
| 6,381,987 B1 | 5/2002 | Werdecker et al. |
| 6,551,366 B1 | 4/2003 | D'Souza et al. |
| 6,672,107 B2 | 1/2004 | Werdecker et al. |
| 6,869,334 B1 | 3/2005 | Leyendecker et al. |
| 7,090,733 B2 | 8/2006 | Munir et al. |
| 7,178,366 B2 * | 2/2007 | Schwertfeger et al. ........ 65/17.3 |
| 7,563,294 B2 * | 7/2009 | Rosenflanz ................... 51/309 |
| 8,359,886 B2 * | 1/2013 | Koseski et al. ................. 65/33.7 |
| 8,430,718 B2 * | 4/2013 | Harrison et al. ................ 451/35 |
| 2003/0180537 A1 | 9/2003 | Meyer |
| 2004/0144132 A1 | 7/2004 | Reznik et al. |
| 2004/0148966 A1 | 8/2004 | Celikkaya et al. |
| 2004/0148967 A1 | 8/2004 | Celikkaya et al. |
| 2004/0237588 A1 * | 12/2004 | Schwertfeger et al. ........ 65/17.3 |
| 2006/0137778 A1 * | 6/2006 | Munir et al. .................. 148/561 |
| 2007/0151166 A1 | 7/2007 | Endres et al. |
| 2007/0237935 A1 | 10/2007 | Mori et al. |
| 2009/0025424 A1 | 1/2009 | Rosenflanz |

* cited by examiner

MATERIALS PROCESSING MEDIUM AND METHOD

RELATED APPLICATION

This application is a continuation-in-part application of pending U.S. patent application Ser. No. 12/677,357, having a 35 USC 371(c) date of Sep. 7, 2010, which is a national stage application of International Patent Application No. PCT/GB2008/050821, having an international filing date of Sep. 12, 2008, which claims the benefit of and priority to Great Britain Patent Application No. 0717849.4, having a filing date of Sep. 13, 2007; this application further claims the benefit of and priority to International Patent Application No. PCT/EP2010/053142, having an international filing date of Mar. 11, 2010, which claims the benefit of and priority to Great Britain Patent Application No. 0904202.9, having a filing date of Mar. 11, 2009, the disclosures of which are is incorporated herein by reference as if set forth in their entireties.

FIELD OF THE INVENTION

The present invention relates to materials processing media, and to a method of forming processing media.

BACKGROUND

It is known to use materials processing media for removing burrs and smoothening the surfaces of mass-produced articles. Burrs may be present on an article for a variety of reasons. In particular, the surfaces of parts produced by metal casting, machining and general processing frequently have burrs and a roughness that is not acceptable in the final product.

Finishing of an article may involve removal of burrs and reduction of the roughness of a surface of the article.

In some cases articles to be finished are placed in a vibratory finishing apparatus such as barrelling or rumbling apparatus, a vibratory trough or bowl, a centrifuge or drag-finisher, together with elements of a finishing medium. A polishing or degreasing compound may also be added.

In the case of deburring of an article, the finishing medium typically has a relatively rough surface, whilst in the case of polishing of an article, the finishing medium typically has a relatively smooth surface.

During the finishing process described above, the finishing medium is agitated, causing the elements of the medium to impinge against the articles to be finished. One or more compounds such as liquid soaps, degreasant, polish etc may be provided together with the finishing medium.

A number of different types of finishing apparatus are known. One such type is the tumbling mill. A tumbling mill is configured to finish articles by means of a 'tumbling' action of elements of the finishing medium on the articles.

The finishing medium itself may have sharp points or corners. The medium may alternatively or in addition have embedded particles of an abrasive material. Some finishing materials are in the form of fired china clay with aluminium oxide particles embedded therein. In the case of finishing materials in the form of a plastics material, quartz particles may be present.

During the finishing process, the sharp points or corners and/or embedded particles exposed at a surface of the medium find their way into grooves and crevices of the article, thereby smoothening the article. In some cases, the finishing medium has a cleaning effect on the article instead of or in addition to a smoothening effect.

The problem exists that during the finishing process sharp points, edges or corners of the elements of the finishing medium are quickly abraded and worn. Consequently, the elements are no longer capable of reaching into grooves and crevices to finish the article efficiently.

U.S. Pat. No. 3,375,615 discloses a finishing tumbling medium in the form of triangular or star-shaped plates having apertures formed therethrough. The apertures are formed close to apices of the plates. Sharp edges of the media are provided, at the apices, in order to promote finishing. In order to prolong the useful life of the finishing medium, the medium is arranged to fracture in use when it has worn to a predetermined degree. The medium is arranged to fracture in the region of the apertures, thereby providing fresh sharp edges for finishing.

The medium is disclosed to be formed either of substantially 100% inorganic ceramic or of a combination of ceramic abrasive particles and a vitreous or plastic resin binder that binds the particles together.

Ceramic media have the disadvantage that they are costly to produce and need to have an abrasive added in order to effect a cutting action.

GB1130923 discloses finishing media in the form of articles having a star-shaped cross-section, and a length greater than the maximum dimension of the star-shaped cross-section. The medium is disclosed to be formed either from a zinc based die casting material, steel, aluminium, brass or a ceramic material.

Ceramic materials have the disadvantage that once they have worn, they must be discarded since it is not easy to reuse such materials. Metallic materials on the other hand are capable in many cases of being reformed by melting and recasting.

However, when metallic finishing media are used to finish metallic workpieces, the medium tends to lose its sharp edges relatively quickly compared with harder materials such as ceramics. Consequently, metallic vibratory finishing media tend to be carbide based. Carbide based materials have the disadvantage that they are relatively costly to produce.

Further disadvantages of metallic finishing media include the fact that such media are relatively difficult to machine and mass produce. The materials also tend to corrode rapidly in wet processing environments, especially where acidic compounds are used.

Consequently, in some cases, finishing media are not utilised at all. Rather, components are subjected to 'self processing' conditions. In other words, the components are left to move against themselves in the vibratory finishing environment, with no finishing medium added. Such conditions are typically utilised only in the case of high volume, low quality parts needing very little deflashing or deburring. Self-finishing processes can result in damage to components during the finishing process.

U.S. Pat. No. 5,373,047 discloses a blasting medium of a thermoplastically processable polymer granulate filled with finely divided metal, the metal particles being coated with an adhesion promoter. Polymer vibratory media have the disadvantage that they present a not insignificant carbon footprint, they are relatively difficult to produce, and they are not easy to recycle.

U.S. 2004/0148966 discloses methods of making glasses and glass-ceramics comprising Al2O3 and SiO2 and discloses that glass-ceramic particles can be useful as abrasive particles. The document discloses embedding glass-ceramic particles in a host matrix to form an abrasive article such as a grinding wheel. In one embodiment particles are bonded by means of a binder to a fibrous mat provided on a substrate.

Furthermore, finishing medium elements may be formed as discrete components not requiring support by a matrix such as the fibrous mat of U.S. 2004/0148966 (see above).

It is also known to use an abrasive wheel to finish an article. In some cases the article is pressed against the wheel as the wheel is spun.

In a first aspect of the present invention there is provided an abrasive element consisting essentially of a glass material that is at least partially devitrified.

By glass material is meant a portion formed from an amorphous or glassy material.

Embodiments in which the elements are formed essentially or exclusively from glass material are especially advantageous over prior art media comprising matrix elements with embedded abrasive particles such as aluminium oxide or the like. This is because the prior art elements tend to shed their abrasive particles during use, forming a slurry of abrasive particles, matrix components and cuttings from the article that is being finished. This slurry can be environmentally problematic for certain abrasive particles, and may need further, expensive processing before it can be disposed of. In contrast, embodiments of the present invention shed only glass particles, which can easily be disposed of or recycled.

By devitrified is meant a material having a crystalline structure that formerly had an amorphous (glassy) structure. By amorphous structure is meant a material that lacks any long range crystal structure as determined by X-ray diffraction. By glass or glassy is meant an amorphous material exhibiting a glass transition temperature.

An abrasive medium (also referred to herein as a finishing medium) according to the present invention has the advantage that it may be fabricated from relatively low cost starting materials and in a relatively low cost manner. Abrasive elements (also referred to as finishing medium elements) according to one or more embodiments of the invention may be fabricated from recycled glass material.

The raw materials from which ceramics are obtained (such as china clay) are typically obtained by mining operations and consequently environmental concerns exist in respect of the use of this material. The use of a recycled material, however, has the advantage that disturbance of a landscape due to a mining operation is not required.

In particular, green (or brown) glass is not normally recycled. Therefore embodiments of the present invention provide an excellent use for this material which is otherwise disposed of at landfill sites or other waste disposal facilities.

In a second aspect of the invention there is provided a building element consisting essentially of a glass material that is at least partially devitrified.

The building element is preferably in the form of a building brick.

The element may have a portion comprising a substantially amorphous material.

The presence of amorphous glass material may have the effect of increasing a toughness of the element. In other words, the presence of amorphous glass material may reduce a propensity of the material to fracture.

Preferably the element comprises or incorporates a plurality of voids formed for example by gas bubbles, preferably air bubbles.

The voids, when exposed on surface regions of the element, present sharp edges that are well-sized for cutting and deburring and finishing. The exposed voids can also act as reservoirs for fluid finishing media that may be used in a vibratory finishing process.

The voids are preferably substantially uniformly dispersed within the element.

More preferably the voids are provided in at least a surface layer of the element.

Still more preferably the voids are exposed in the surface layer thereby to present sharp edges at the surface.

The voids may be exposed at the surface thereby to provide reservoirs for fluid finishing media that may be used in a finishing process.

Preferably the voids have a nominal diameter in the range of from around 50 nm to around 5 mm, preferably from around 1 micron to around 1 mm, more preferably around 10 microns to around 500 microns, still more preferably around 100 microns to around 500 microns.

The volume of the element in the form of devitrified material may be in the range from around 1% to around 100%.

The volume of the element in the form of devitrified material may be in the range from around 20% to around 80%, optionally around 50%.

Preferably an element has a longest dimension in the range from about 5 mm to about 80 mm.

An element may have a longest dimension in the range from about 5 to about 50 mm.

Elements with dimensions in these ranges have been found to be particularly suited to finishing articles over a range of different sizes. Furthermore, a size of an element may be selected so that the element is likely to be able to be able to impinge upon all required surfaces of the article without becoming lodged in a recess or crevice or other feature of an article.

Preferably an element has a longest dimension in the range from about 10 to about 40 mm.

An element may comprise a plurality of regions of a crystalline material at a free surface of the element.

An element preferably consists essentially of an amorphous glass material and a crystallised glass material.

The element may consist essentially of an amorphous glass material and a crystallised glass material.

The crystallised glass material may be provided in the form of particles dispersed within the amorphous glass material.

The amorphous glass material may be provided in the form of particles dispersed within the crystallised glass material.

Preferably an element consists essentially of at least partially devitrified material, preferably devitrified glass material.

The devitrified material may comprise at least a portion having a needle-like morphology.

An element may comprise silica.

An element may have a hardness value of around 5.5 on the Moh scale.

If the hardness is excessively high, finishing elements are at risk of suffering fracture during use. If an element is excessively soft, the element is at risk of losing its effectiveness due to rounding of edges of the element.

The shape of an element may be at least one selected from amongst a cuboid, an ellipsoid, a prism, a cone, a tetrahedron, a pyramid, a polyhedral solid, a sphere, a triangle, a disc or disc-like structure and a segment of a disc or disc-like structure.

An element may be provided in the shape of a disc suitable for use as a grinding or polishing wheel.

An element may comprise at least one support member arranged to prevent shatter of the disc.

The support member may have at least a portion embedded within the disc.

In a third aspect of the invention there is provided a grinding or polishing wheel comprising an element according to the first aspect of the invention.

Preferably the wheel has a plurality of elements each in the shape of a segment of a disc or disc-like structure, the elements being coupled together thereby to from the wheel.

The elements may be are coupled together by means of a hub member.

In a fourth aspect of the invention there is provided a method of forming an abrasive element comprising the steps of: providing a plurality of pieces of a glass material; and subjecting the plurality of pieces of the glass material to a heat treatment thereby to form a solid cast member having at least a portion comprising a devitrified material.

In a fifth aspect of the invention there is provided a method of forming a building element comprising the steps of: providing a plurality of pieces of a glass material; and subjecting the plurality of pieces of the glass material to a heat treatment thereby to form a solid cast member having at least a portion comprising a devitrified material.

The building element may be in the form of a building brick.

Preferably the cast member is formed to comprise a plurality of voids.

The method may comprise the step of placing the pieces of glass material into a mould.

The method may further comprise the step of pouring the pieces of glass material into the mould.

The method may comprise the step of compacting the pieces of glass material in the mould.

The step of providing a plurality of pieces of the glass material may further comprise providing a plurality of pieces of a filler material arranged to undergo thermal decomposition during said heat treatment thereby to provide the plurality of voids.

Preferably the filler material comprises at least one selected from amongst husks of a plant material, crushed egg shell and a polymer material.

The pieces of filler material may have a size in the range of up to around 500 um, optionally up to around 250 um.

The method may comprise the step of mixing the plurality of pieces of glass material and the plurality of pieces of filler material.

The method may further comprise the step of placing the pieces of glass material and filler material into the mould.

Preferably the pieces of glass material are or comprise glass cullet.

Preferably the plurality of pieces of material have an average size in a range selected from amongst up to around 4 mm, around 4 mm to around 2 mm, from around 3 mm to around 1 mm, from around 1.5 mm to around 0.75 mm, from around 1.5 mm to around 500 microns and up to around 100 microns.

It is generally found that the smaller the average size of the pieces from which a finishing element is made, the smoother the surface of the finished article. Elements made from pieces having an average size at the lower end of the range are particularly well suited to finishing articles such that the finished article has a relatively low surface roughness.

The cast member preferably comprises amorphous glass material.

The method may further comprise the steps of cutting the cast member thereby to form a plurality of finishing medium elements.

The method may comprise the step of forming the cast member to have a shape that is at least one selected from amongst a cuboid, an ellipsoid, a prism, a cone, a tetrahedron, a pyramid, a polyhedral solid, a sphere and a disc or disc-like shape.

Preferably the abrasive element is formed in the shape of a cone having a cone angle in the range of from around 30° to around 120°.

Preferably the abrasive element is formed having a cone angle of one selected from amongst 30°, 60°, 90° and 120°.

The abrasive element may be formed to have a disc or disc-like shape, the element comprising a support member having at least a portion embedded within the element.

The support member may be arranged to prevent the disc from shattering.

The heat treatment may comprise the step of heating to a temperature in the range from about 700° C. to about 1100° C., optionally around 750° C. to around 950° C.

The heat treatment may further comprise the step of heating to a temperature in the range from about 800° C. to about 1000° C., optionally around 975° C.

Preferably the heat treatment comprises the step of heating to a temperature in the range from about 850° C. to about 950° C., preferably from about 900° C. to about 920°, more preferably about 900°.

The heat treatment may comprise the step of heating to a temperature in the range from about 700° C. to about 1100° C. for a period of from around 1 hour to around 3 hours, preferably from about 700° to about 950° C., more preferably from around 900° C. to around 920°, still more preferably around 900°.

The heat treatment may comprise the step of heating to a temperature in the range from about 700° C. to about 1100° C. for a period of around 2 hours, preferably from about 700° to about 950° C., more preferably from around 900° C. to around 920°, still more preferably around 900°.

The heat treatment may comprise the step of heat treating the at least one piece thereby to melt at least a portion of said at least one piece; subsequently cooling to form a solid cast member having at least a portion comprising a devitrified material.

The method may be arranged to provide an abrasive element having a hardness value of around 5.5 mohs.

In a sixth aspect of the invention there is provided a method of reforming at least one abrasive element comprising the steps of: providing at least one abrasive element according to the first aspect; performing a heat treatment; subsequently, cooling to form a solid cast member comprising a devitrified material.

This has the advantage that spent finishing elements may be reformed to produce fresh finishing elements. There is therefore no requirement to dispose of spent finishing elements in a landfill or other waste disposal facility.

The step of providing the at least one abrasive element further comprises the step of fracturing the at least one abrasive element thereby to form a plurality of pieces of material.

Preferably the step of fracturing the at least one abrasive element is followed by the step placing plurality of pieces of the fractured element in a mould.

In a seventh aspect of the invention there is provided an abrasive element according to the first aspect of the invention in combination with a degreasant and/or a polishing compound.

In an eighth aspect of the invention there is provided a method of finishing an article comprising the steps of: providing a plurality of finishing medium elements according to the first aspect; and causing the abrasive elements to impinge against the article thereby to reduce a surface roughness of the article.

The method may further comprise the steps of providing at least one selected from amongst a degreasing or cleaning or polishing compound thereby to enhance a reduction in surface roughness of the article.

Embodiments of the invention will now be described with reference to the accompanying figures in which.

According to a first embodiment of the invention, an abrasive element (or 'finishing medium element') is formed from partially recrystallised silica glass material. Other glass materials are also useful.

Amorphous silica glass is widely available as a commodity material at relatively low prices in comparison to metallic materials. For example, amorphous silica glass is available in the form of recycled beverage bottles and other recycled articles.

In one embodiment of the invention, a starting material in the form of amorphous silica glass is crushed into small pieces. In some embodiments of the invention the pieces are around 4 mm in diameter. By 'diameter' is meant a maximum dimension of a piece of material. Other sizes are also useful.

In some embodiments, graded mixed cullet is used, having pieces having a maximum dimension of around 4 mm.

In some embodiments pieces having a larger diameter are used. For example, pieces having a diameter of up to around 5 mm may be used.

In some embodiments, pieces having a diameter of from a few microns to around 5 mm are used.

According to the first embodiment the crushed pieces are placed in a mould and subjected to a heat treatment. The heat treatment is such that the crushed pieces are at least partially melted, before being cooled to form a material (also referred to as a 'cast member') having at least a portion comprising a devitrified silica material. Devitrified silica has the property that it is relatively hard and resistant to wear by abrasion.

The crushed pieces may be subjected to a compaction process in the mould in order to reduce a porosity of the cast member. By reduction in porosity is included a reduction in a number and/or size of voids within the cast member.

Compaction may involve agitation of the mould and/or application of pressure to the crushed pieces. Other compaction processes are also useful.

The cooled material has both regions of amorphous material and regions of devitrified, crystallised silica material. The crushed glass starting material, on the other hand, is typically almost entirely composed of amorphous silica material.

Figure 1:
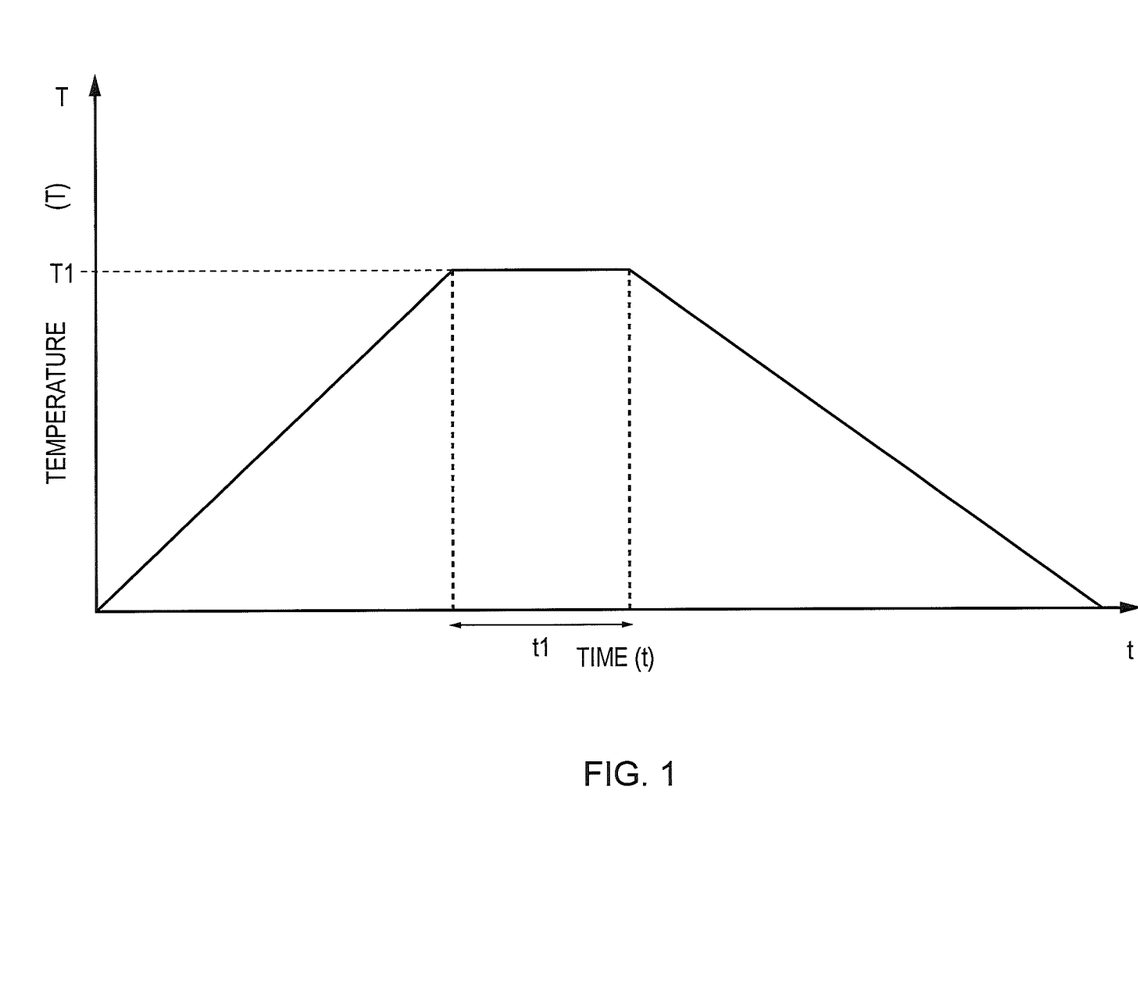
FIG. 1 is a plot of temperature as a function of time for a heat treatment according to first and second embodiments of the invention.

A plot of temperature as a function of time for a heat treatment process according to an embodiment of the invention is shown schematically in FIG. 1.

The crushed pieces are heated to a temperature $T1$ of from around 700° C. to around 1400° C. The pieces are held at this temperature for a period of time $t1$ of from around 1 to around 6 hours.

In a preferred embodiment of the invention the crushed pieces are heated to a temperature $T1$ of around 900° C. for a period $t1$ of around 2 hours. In some embodiments the crushed pieces are heated to a temperature $T1$ of around 925° C.

The degree of recrystallisation experienced by the glass material during cooling from elevated temperature $T1$ determines to a substantial extent the hardness of the resulting finishing medium. The time $t1$ and temperature $T1$ used will influence the proportion of crystalline material comprised in the finishing media. A higher proportion of crystalline material is typically found to result in a finishing medium of increased hardness.

Abrasive media containing a higher proportion of crystalline material also have increased brittleness, which may result in fracture in use. An acceptable balance between the relative proportions of amorphous and crystalline material must therefore be achieved, in order to obtain an abrasive element that is sufficiently hard not to wear at too high a rate, whilst being sufficiently tough not to fracture too easily during a finishing process.

In some embodiments the elements have up to around 75 to 80% crystalline material by volume.

Once the partially recrystallized glass material has been cooled to room temperature, it is cut to form elements of a shape and size suitable for use as a finishing medium. Cutting is typically performed using a conventional diamond tipped circular saw blade.

In some embodiments of the invention cutting is performed by means of a water-jet or a laser. Other cutting means are also useful.

Figure 2:
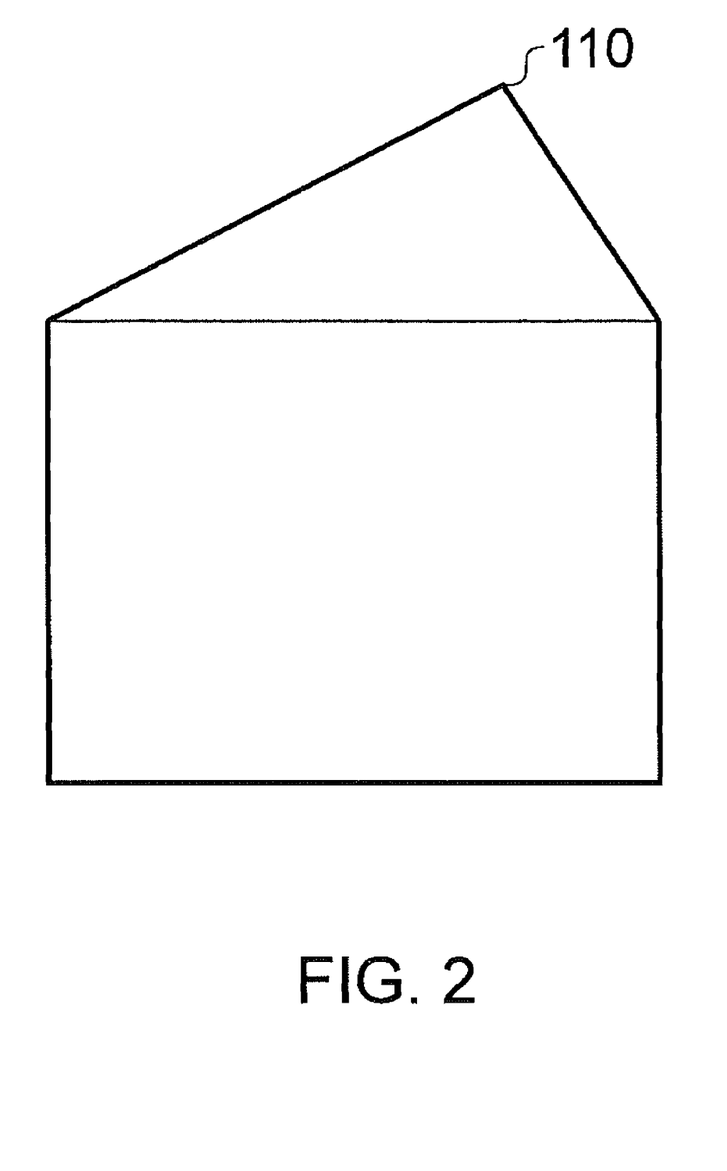
FIG. 2 shows a prism-shaped finishing medium element according to a first embodiment of the invention.

According to one embodiment of the invention the material is cut to form prism-shaped finishing media suitable for use in a vibratory finishing process as shown generally at 110 in FIG. 2. According to one embodiment, a length of a side of a base of each prism is in the range from about 5 mm to about 50 mm. In some embodiments the range is from about 10 mm to about 40 mm.

The size of the media is selected according to a size and shape of articles to be finished. The size is selected to avoid a problem of jamming of finishing media elements in a recess or other formation of an article to be finished.

According to one embodiment of the invention the finishing media are in the form of solid prismatic pieces formed by cutting from a block of partially devitrified material.

In alternative embodiments, the material is cut to form a different shape, such as a cube, a cuboid, an ellipsoid, a body having a cross-section or other portion in the form of a star shape, or any other suitable shape.

According to a further embodiment of the invention, finishing media are formed by melting particles of crushed silica glass within individual moulds so as to form finishing media of substantially a required final shape directly. It is therefore not necessary to cut the solidified melt in order to form finishing medium elements.

Figure 3:
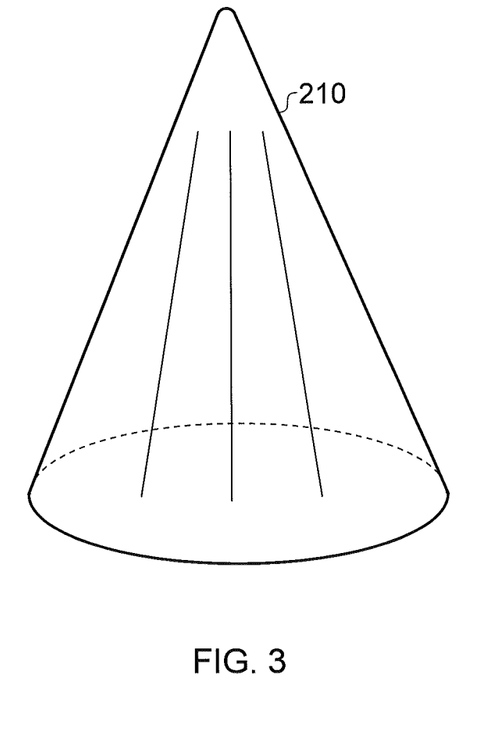
FIG. 3 shows a substantially conical-shaped finishing medium element according to a second embodiment of the invention.
Figure 4:
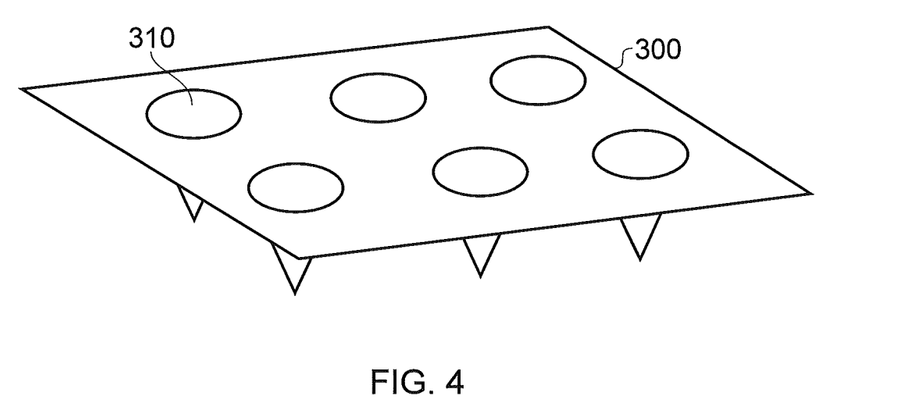
FIG. 4 shows a mould suitable for forming a plurality of finishing medium elements according to the second embodiment of the invention.

FIG. 3 is a schematic illustration of a finishing medium element 210 having a substantially conical shape that was formed directly from a mould. A suitable mould for forming such elements 210 is shown in FIG. 4. The mould is provided with a plurality of well elements 310 of a shape corresponding to that of the conical finishing medium element 210.

Finishing media of conical shape have the advantage that they are readily removed from a mould once the cast material has cooled. Thus, finishing medium elements may be manufactured rapidly and conveniently.

In some embodiments the mould is formed by removing material from a solid block of a mould material.

Use of a mould enables abrasive elements of a variety of complex shapes to be formed in a relatively rapid and efficient manner. This is at least in part because it is not necessary to perform a cutting operation once the melt has cooled.

It will be appreciated that once finishing medium elements according to embodiments of the invention have become spent, e.g. worn or reduced in size to such an extent that their effectiveness is no longer acceptable, they may be recycled to form new finishing medium elements.

Thus, spent elements may be heated and cooled to form fresh abrasive elements. In some embodiments, spent elements are crushed to form particles that are then subjected to a heat treatment. In some embodiments the particles are placed in a mould such as that shown in FIG. 4 and subjected to a heat treatment in a similar manner to that described above.

The recycling of spent elements has the advantage of reducing wastage of material, thereby reducing a burden of a process using abrasive elements on waste disposal facilities. The fact that the raw material from which the finishing elements are formed is obtained from recycled silica glass material in the first place is also a considerable advantage in reducing the environmental impact of the process.

Figure 5:
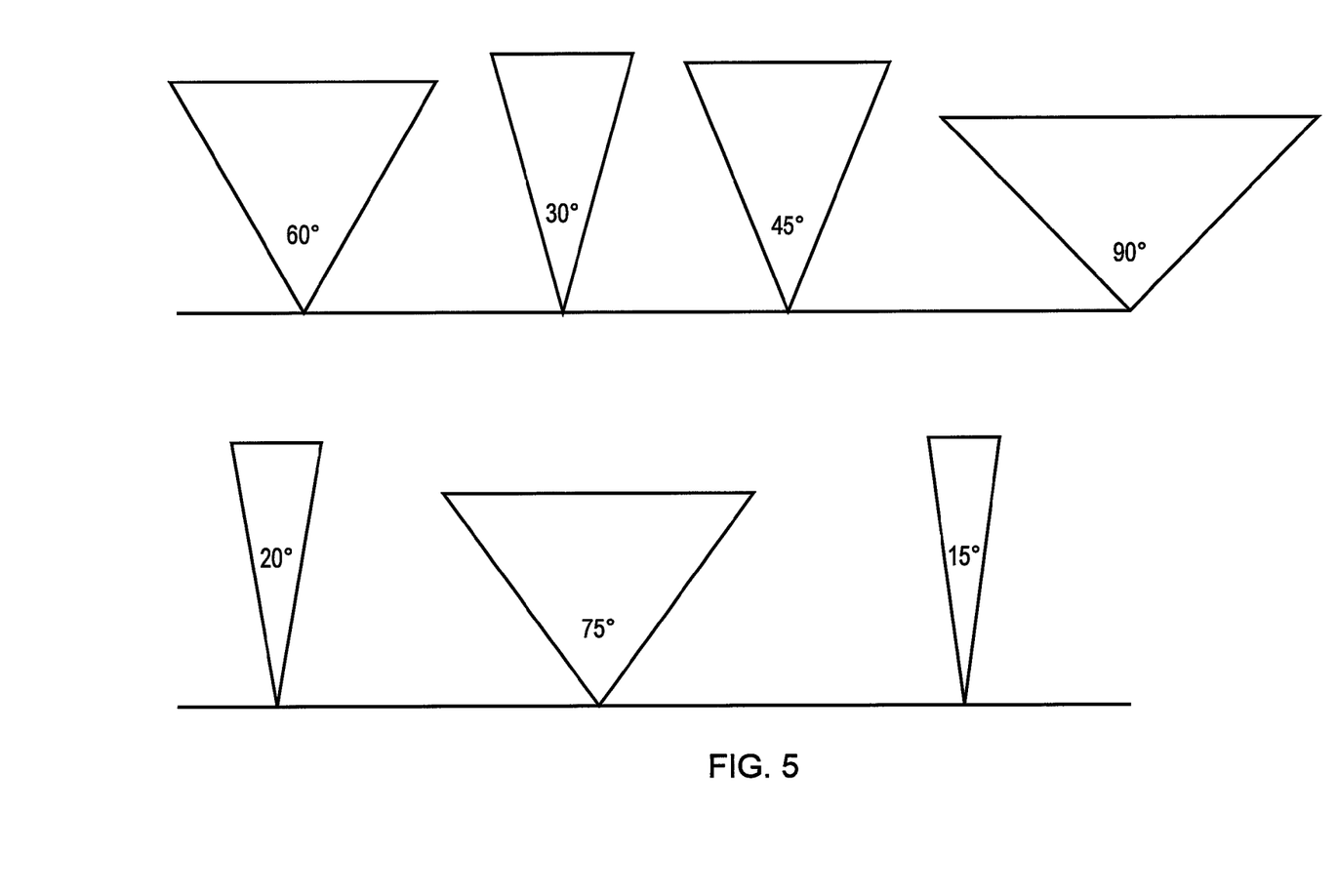
FIG. 5 shows a plurality of finishing media of conical shape having cone angles in the range from about 15° to about 90°.

FIG. 5 shows a set of finishing medium elements according to an embodiment of the invention having cone angles in the range of from around 15° to around 90°. A cone angle of up to around 120° is also useful.

Figure 6:
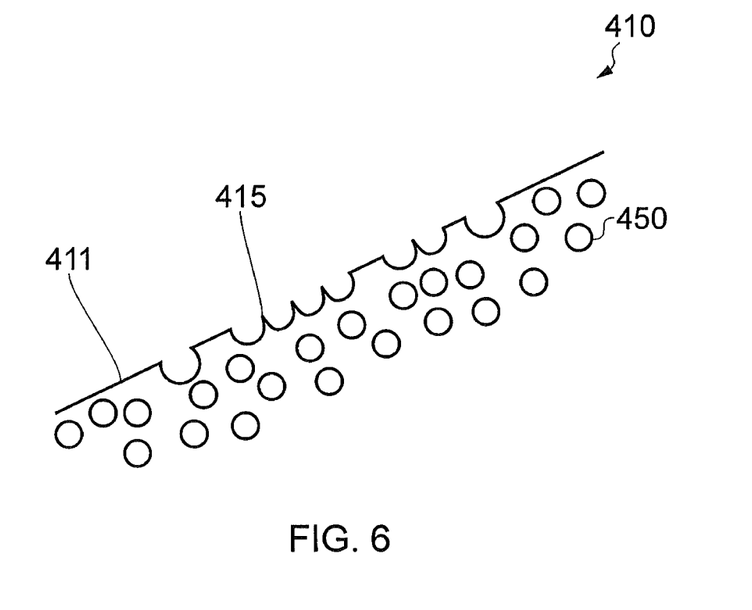
FIG. 6 is a cross-sectional view of a finishing element having an aerated structure.

FIG. 6 shows an internal structure of an element 410 formed to have a porous or aerated structure. That is, the element 410 comprises a plurality of pores or voids 450. Such a structure has the advantage that an element 410 having a free surface 411 presenting a plurality of sharp edges 415 may be provided in a convenient manner not requiring bonding of particles to a matrix. Furthermore, it is to be understood that as the abrasive element wears in use, fresh voids are exposed at the free surface. Thus, fresh sharp surfaces are exposed as the element wears.

Furthermore, as the element wears, any shards of material breaking from the element are of relatively small size compared with the size of the elements themselves. Thus, the risk of shards blocking filters and associated fluid handling apparatus such as a vibratory finishing tool is reduced relative to some known finishing medium elements and abrasive materials.

The aerated structure may be controlled by varying an extent to which compaction of glass pieces is performed before heating to form a cast member. The more the pieces are compacted, the lower the porosity of the cast member. Furthermore, in some embodiments particles of a filler medium such as ground husks of wheat or other organic material may be used, as can crushed egg shell. Other filler materials are also useful.

Compaction may be performed by agitating a mould in which the pieces are provided and/or applying pressure to the pieces.

Figure 7:
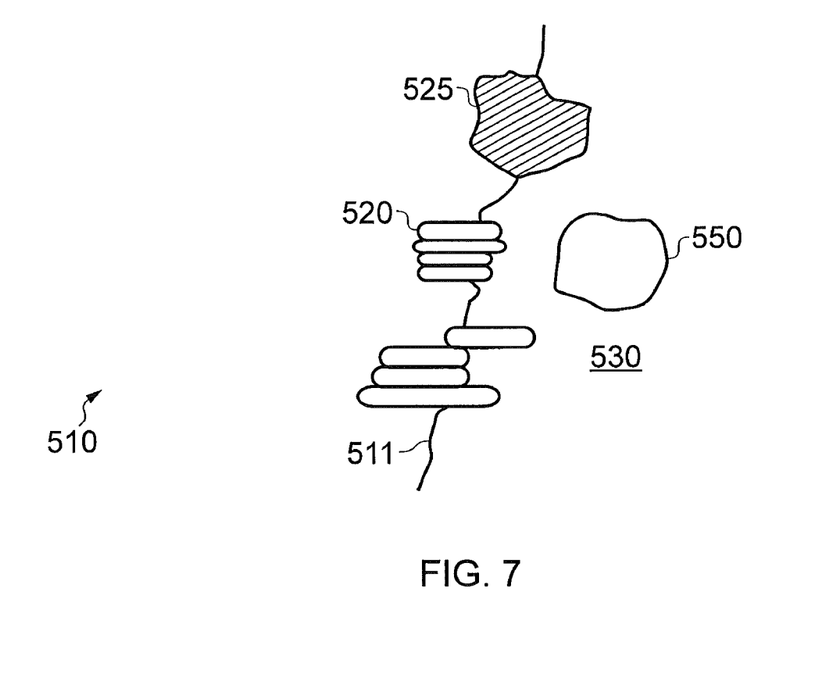
FIG. 7 is a cross-sectional view of a finishing element showing the presence of crystalline (devitrifed) material at a free surface of the element.

In some embodiments of the invention a finishing medium element comprises crystalline material exposed at a surface of the element that presents an abrasive surface to an article to be finished. In some embodiments crystalline material of the element is in the form of elongate crystals that project from an external surface of the element. FIG. 7 is a cross-sectional view of a portion of a finishing element 510 having a free surface 511. Crystalline (devitrified) material 520, 525 is present at the free surface 511, in some embodiments some of the crystalline material being in the form of elongate crystals 520 protruding from the free surface 511. Voids (or pores) 550 may also be present in the elements 510.

It is to be understood that a size of the crystals present in the finishing elements may depend upon the heat treatment applied to the glass starting material. Longer annealing times at elevated temperature typically result in the formation of larger crystals.

It is to be further understood that in some embodiments the devitrified material is present in combination with a matrix of glassy material 530 such that the crystalline material 520, 525 is effectively 'embedded' in the glassy material 530. Thus, the process of heat treating the glass results in the formation of a particle/matrix structure without a requirement to mix particles and matrix material from separate sources. The cost and complexity of the manufacturing process is thereby greatly simplified.

Thus, in some embodiments of the invention up to at least three features of an abrasive element contribute to abrasion or polishing of articles that contact the element. These are (i) the size of cullet used to form the abrasive element, (ii) a size of crystals of material present in the element as determined by the time/temperature profile of the heat treatment the cullet is subjected to, and (iii) an extent to which the element has pores formed therein.

It has been found that larger pieces of cullet poured into a mould and subsequently subjected to a heat treatment whereby the cullet is sintered to form an abrasive element and at least partially devitrified results in elements having a coarser surface morphology than in the case of the use of smaller pieces of cullet. Thus, larger pieces of cullet generally result in elements having a coarser surface finish than smaller pieces of cullet.

Thus, a more granular structure is provided using larger pieces of cullet, the surface of the element having undulations on a length scale larger than if smaller pieces of cullet are used.

The size of the crystals of material present in the abrasive elements is largely determined by the temperature profile of a given heat treatment (i.e. the temperature of the elements as a function of time during the heat treatment). It is to be understood that larger crystals exposed at a free surface of an abrasive element typically result in an element having a coarser surface morphology than an element in which smaller crystals are exposed at a free surface.

Figure 8:
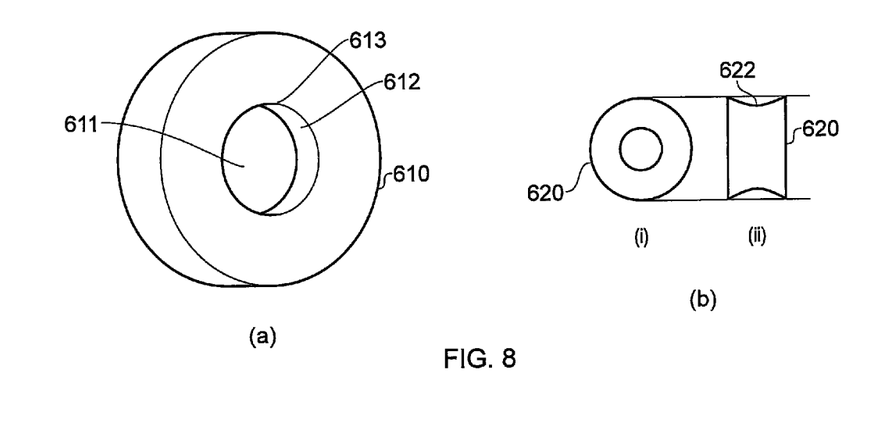
FIG. 8 shows (a) a perspective view of a grinding or polishing wheel according to an embodiment of the invention and (b) a hub element arranged to be provided at a core of the polishing wheel in (i) front elevation and (ii) side elevation.

In some embodiments an abrasive element is provided in the form of a grinding or polishing wheel. FIG. 8 (a) shows such an element being a wheel element 610. The wheel element 610 has an aperture 611 defined by an inner circumferential surface 612 of the wheel element 610, the surface 612 being concentric with an axis of rotation of the element 610.

FIG. 8(b) shows a hub element 620 being an element arranged to be provided within aperture 611 of the wheel element 610. In some embodiments the wheel element 610 is arranged to be formed around the hub element 620, i.e. the heat treatment process whereby cullet is heated to form a cast member is undertaken with the hub element 620 in-situ. In some embodiments the hub element 620 is coupled to the wheel element 610 after the wheel element has been subjected to the heat treatment to form the cast member.

In some embodiments the hub element 620 is shaped to have a concave outer circumferential surface 622 arranged to cooperate with a corresponding inner circumferential surface of the wheel element 610 to reduce a risk of the wheel element 610 and hub element 620 becoming detached from one another. Other shapes of the surface 622 are also useful.

Figure 9:
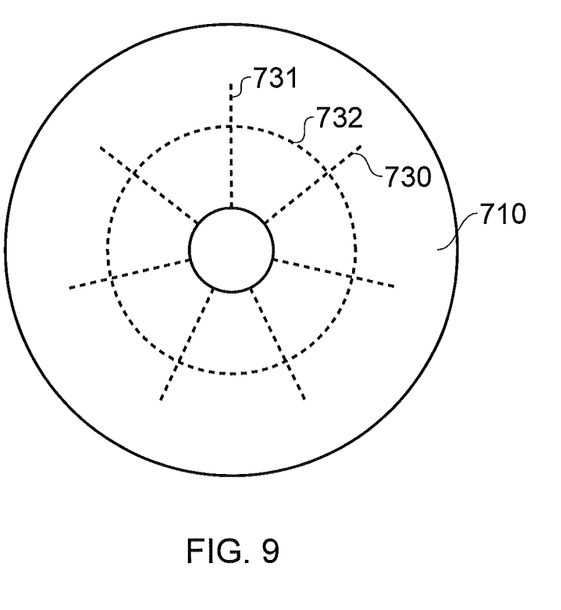
FIG. 9 shows a grinding or polishing wheel according to an embodiment of the invention having a support member embedded in a disc-shaped abrasive element.

FIG. 9 shows a wheel element 710 according to an embodiment of the invention having a support member 730 (shown dotted) embedded within the wheel element 710. The support member 730 is arranged to increase a resistance of the wheel element 710 to fracture. In some embodiments the support member 730 is provided on an outside of the wheel element 710, i.e. the support member 730 is not embedded in the wheel element 710. In some embodiments the support member 730 is partially embedded in the wheel element 710.

In the embodiment of FIG. 9 the support member 730 comprises a plurality of radial spoke elements 731 and one or more concentric ring elements 732. In some embodiments either spoke elements 731 or one or more ring elements 732 are provided. Other support member configurations are also useful.

Figure 10:
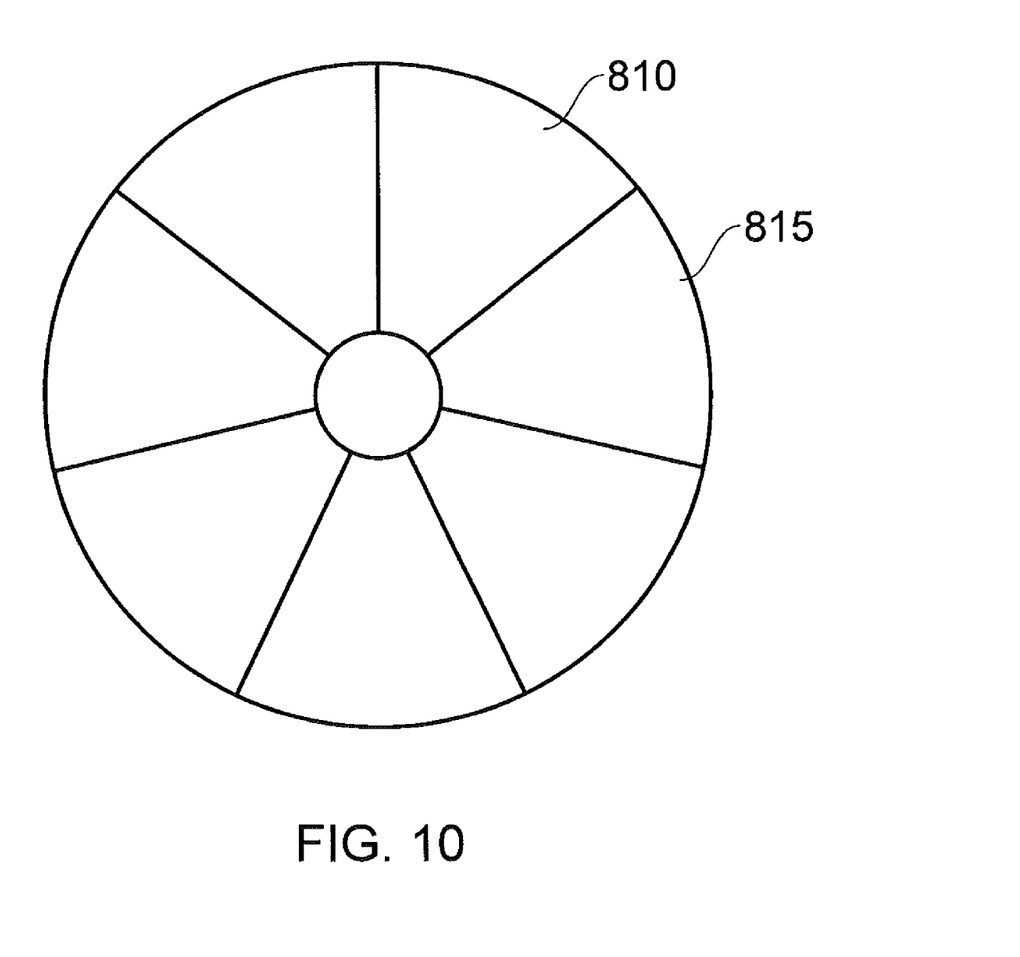
FIG. 10 shows a grinding or polishing wheel according to an embodiment of the invention having abrasive elements in the form of segments of a disc.

FIG. 10 shows an embodiment in which a wheel element 810 comprises a plurality of substantially wedge-shaped segments 815 of uniform thickness. Other arrangements are also useful. The segments 815 may be coupled to one another by means of an adhesive. Alternatively or in addition the segments 815 may be coupled to one another by means of one or more coupling elements.

In some embodiments the wheel element is formed by heating glass cullet or crushed abrasive elements (e.g. discarded or used elements) to a temperature or around 850° C. for a period of around 4 hours.

In one embodiment of the invention building elements for use in the construction of a building are provided. The elements may be in the form of brick elements to be used as a substitute for clay fired bricks or any other building bricks.

The elements have the advantage of strength, resistance to breakage, and an ability to be recycled readily and reformed when a building reaches an end of its life.

In some embodiments building elements are formed to have sufficient porosity on a mating surface thereof to allow mortar to be used to couple the building elements to one another substantially as in the case of conventional construction practice using clay bricks.

The use of such building elements has the advantage that the raw material may be drawn from a single source (recycled glass), and processed to form building elements in a relatively straightforward manner. It is not necessary to introduce a further medium such as a binder medium.

In some embodiments filler material arranged to undergo thermal decomposition when heated may be used in order to increase a porosity of the building elements in a similar manner to that described above in respect of abrasive elements/finishing medium elements. The aforegoing discussion in respect of processing and heat treatment of a glass material in order to form abrasive elements/finishing medium elements may be applied to the formation of building elements.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. An abrasive solid cast member for use in a grinding or polishing wheel, the cast member comprising a plurality of pieces of crushed silica glass cullett heat treated to form a unitary body of at least partially devitrified glass.

2. A cast member as claimed in claim 1, having a portion comprising a substantially amorphous material.

3. A cast member as claimed in claim 1, comprising or incorporating a plurality of voids formed for example by gas bubbles, preferably air bubbles.

4. A cast member as claimed in claim 3, wherein the voids are substantially uniformly dispersed within the element.

5. A cast member as claimed in claim 3, wherein the voids are provided in at least a surface layer of the element.

6. A cast member as claimed in claim 5, wherein voids are exposed in the surface layer thereby to present sharp edges at the surface.

7. A cast member as claimed in claim 3, wherein the voids have a nominal diameter in the range of from around 50 nm to around 5 mm, preferably from around 1 micron to around 1 mm, more preferably around 10 microns to around 500 microns, still more preferably around 100 microns to around 500 microns.

8. A cast member as claimed in claim 1, wherein the volume of the element in the form of devitrified material is in the range from around 20% to around 80%, optionally around 50%.

9. A cast member as claimed in claim 1, comprising a plurality of regions of a crystallised glass material at a free surface of the element.

10. A cast member as claimed in claim 1, consisting essentially of an amorphous glass material and a crystallised glass material.

11. A cast member as claimed in claim 1, wherein the devitrified material comprises at least a portion having a needle morphology.

12. A cast member as claimed in claim 1, having a hardness value of around 5.5 on the Moh scale.

13. A cast member as claimed in claim 1, in the shape of a disc suitable for use as a grinding or polishing wheel.

14. A cast member as claimed in claim 13, comprising at least one support member arranged to prevent shatter of the disc.

15. A cast member as claimed in claim 14, wherein the support member has at least a portion embedded within the disc.

16. A grinding or polishing wheel comprising a cast member as claimed in claim 1.

17. A wheel as claimed in claim 16, comprising a plurality of elements each in the shape of a segment of a disc structure, the segments being coupled together thereby to form the wheel.

18. A wheel as claimed in claim 17, wherein the segments are coupled together by means of a hub member.

19. A grinding or polishing wheel as claimed in claim 16, wherein the cast member is in the form of a disc.

20. A building element in the form of a solid cast member consisting essentially of a plurality of pieces of crushed silica glass cullett heat treated to form a unitary body of at least partially devitrified glass.

21. A cast member as claimed in claim 20, in the shape of at least one selected from amongst a cuboid, an ellipsoid, a prism, a cone, a tetrahedron, a pyramid, a polyhedral solid, a sphere, a triangle, a disc structure and a segment of a disc structure.

22. A building element as claimed in claim 20, in the form of a building brick.

23. A method of forming an abrasive element for use in a grinding or polishing wheel, the method comprising the steps of:
providing a plurality of pieces of a crushed silica glass cullett; and
subjecting the pieces of cullett to a heat treatment thereby to form a solid cast member from the cullett, the heat treatment resulting in at least partial devitrification of the crushed silica glass cullett.

24. A method as claimed in claim 23, wherein the step of providing a plurality of pieces of the crushed silica glass cullett further comprises providing a plurality of pieces of a filler material arranged to undergo thermal decomposition during said heat treatment thereby to provide a plurality of voids.

25. A method as claimed in claim 24, where the filler material comprises at least one selected from amongst husks of a plant material, crushed egg shell and a polymer material.

26. A method as claimed in claim 24, wherein the pieces of filler material have a size in the range of up to around 500 um, optionally up to around 250 um.

27. A method as claimed in claim 23, wherein the plurality of pieces of crushed silica glass cullett have an average size in a range selected from amongst up to around 4 mm, around 4 mm to around 2 mm, from around 3 mm to around 1 mm, from around 1.5 mm to around 0.75 mm, from around 1.5 mm to around 500 microns and up to around 100 microns.

28. A method as claimed in claim 23, wherein the abrasive element is formed to have a disc or disc-like shape, the element comprising a support member having at least a portion embedded within the element.

29. A method as claimed in claim 23, whereby the heat treatment comprises the step of heating to a temperature in the range from about 700° C. to about 1100° C., optionally around 750° C. to around 950° C.

30. A method as claimed in claim 23, whereby the heat treatment comprises the step of heating to a temperature in the range from about 800° C. to about 1000° C., optionally around 975° C.

31. A method as claimed in claim 23, whereby the heat treatment comprises the step of heating to a temperature in the range from about 850° C. to about 950° C., preferably from about 900° C. to about 920°, more preferably about 900°.

32. A method as claimed in claim 23, whereby the heat treatment comprises the step of heating to a temperature in the range from about 700° C. to about 1100° C. for a period of from around 1 hour to around 3 hours, preferably from about 700° to about 950° C., more preferably from around 900° C. to around 920°, still more preferably around 900°.

33. A method as claimed in claim 23, whereby the heat treatment comprises the step of heating to a temperature in the range from about 700° C. to about 1100° C. for a period of around 2 hours, preferably from about 700° to about 950° C., more preferably from around 900° C. to around 920°, still more preferably around 900°.

34. A method as claimed in claim 23, wherein the heat treatment comprises the step of heat treating the crushed silica glass cullett thereby to melt at least a portion of said crushed silica glass cullett; subsequently
cooling to form a solid cast member having at least a portion comprising a devitrified material.

35. A method of forming a building element, the method comprising the steps of:
providing a plurality of pieces of a crushed silica glass cullett; and
subjecting the pieces of cullett to a heat treatment thereby to form a solid cast member from the cullett, the heat treatment resulting in at least partial devitrification of the crushed silica glass cullett.

* * * * *